United States Patent [19]

Weaver et al.

[11] Patent Number: 4,650,861

[45] Date of Patent: Mar. 17, 1987

[54] AZO DYES FROM 5-AMINO-4-NITROPYRAZOLE COMPOUNDS AND ANILINE COUPLERS

[75] Inventors: Max A. Weaver; Gary T. Clark, both of Kingsport; Bill A. Eller, Gray, all of Tenn.

[73] Assignee: Ciba-Geigy Corporation, Ardsley, N.Y.

[21] Appl. No.: 514,118

[22] Filed: Jul. 15, 1983

[51] Int. Cl.[4] .................... C09B 29/036; C09B 29/40; D06P 1/18; D06P 3/54

[52] U.S. Cl. .................... 534/777; 534/733; 534/753; 534/774; 534/776; 534/792; 534/793; 534/794

[58] Field of Search ................ 260/163, 162; 534/733, 534/753, 774, 776, 777

[56] References Cited

U.S. PATENT DOCUMENTS

| | | | |
|---|---|---|---|
| 3,515,715 | 6/1970 | Straley et al. | 260/163 |
| 3,639,384 | 2/1972 | Weaver et al. | 534/734 X |
| 3,639,385 | 2/1972 | Weaver et al. | 534/734 X |
| 3,948,878 | 4/1976 | Coispeau | 260/163 |
| 4,101,540 | 7/1978 | Coispeau | 260/147 |
| 4,210,582 | 7/1980 | De Montmollin et al. | 260/163 X |
| 4,271,071 | 6/1981 | Clark | 534/777 X |
| 4,301,070 | 11/1981 | Giles et al. | 260/163 X |

*Primary Examiner*—Floyd D. Higel
*Attorney, Agent, or Firm*—Edward McC. Roberts

[57] ABSTRACT

This invention relates to novel azo dyes containing a 4-nitropyrazole azo moiety which may be substituted, for example, with an alkyl group which itself may be substituted, and an aniline coupler which may be substituted. The dyes produce bright red shades on hydrophobic textile fiber including polyesters, polyamides, and cellulose esters and show unexpected improvements in one or more of such properties as fastness to light, wash, ozone, gas such as oxides of nitrogen, perspiration, crock and sublimation, dyeability at desirable low energy levels to deep shades, build, pH stability, bloom resistance, leveling, migration, dye bath exhaustion, dye transfer, and the like.

1 Claim, No Drawings

AZO DYES FROM 5-AMINO-4-NITROPYRAZOLE COMPOUNDS AND ANILINE COUPLERS

This invention relates to novel azo dyes containing a 4-nitropyrazole azo moiety which may be substituted, for example, with an alkyl group which itself may be substituted, and an aniline coupler which may be substituted. The dyes produce bright red shades on hydrophobic textile fiber including polyesters, polyamides, and cellulose esters and show unexpected improvements in one or more of such properties as fastness to light, wash, ozone, gas such as oxides of nitrogen, perspiration, crock and sublimation, dyeability at desirable low energy levels to deep shades, build, pH stability, bloom resistance, leveling, migration, dye bath exhaustion, dye transfer, and the like, over such prior art as U.S. Pat. Nos. 3,634,391 and 4,354,970.

The dyes of this invention have the general formulae:

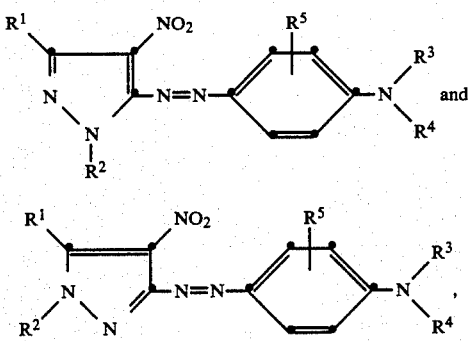

wherein:

$R^1$ is H or an $R^2$ substituent;

$R^2$ is a substituent selected from alkyl; aryl; cyclohexyl; aryl having 1-3 substituents independently selected from alkyl, cyano, hydroxy, alkoxy, nitro, acyloxy, alkanoyl, halogen, aryloxy, alkylthio, alkylsulfonyl, alkoxycarbonyl, carbamoyl, alkylcarbamoyl, dialkylcarbamoyl, sulfamoyl, alkylsulfamoyl, dialkylsulfamoyl, succinimido ($C_4H_4O_2N$), and phthalimido ($C_8H_4O_2N$); cyclohexyl having 1-3 substituents independently selected from alkyl, alkoxy, halogen, alkanoyl, alkoxycarbonyl, acyloxy, carbamoyl, alkylcarbamoyl, dialkylcarbamoyl, sulfamoyl, alkylsulfamoyl, dialkylsulfamoyl, alkylsulfonyl, dialkylsulfonyl, hydroxy, cyano, and acylamido; and alkyl having 1-3 substituents independently selected from cyano, hydroxy, alkoxy, aryl, acyloxy, alkanoyl, halogen, aryloxy, alkylthio, alkylsulfonyl, alkoxycarbonyl, carbamoyl, alkylcarbamoyl, dialkylcarbamoyl, sulfamoyl, alkylsulfamoyl, dialkylsulfamoyl, succinimido, and phthalimido;

$R^5$ is hydrogen or one or two substituents selected independently from fluorine, chlorine, bromine, alkyl, cycloalkyl, alkoxy, phenoxy, alkylthio, arylthio, and radicals having the formula $—NH—X—R^9$ in which X is $—CO—$, $—COO—$, or $—SO_2—$, and $R^9$ is selected from alkyl, aryl, cycloalkyl and alkyl substituted with halogen, hydroxy, phenoxy, aryl, cyano, cycloalkyl, alkylsulfonyl, alkylthio, alkanoyloxy, and alkoxy, and when X is $—CO—$, $R^9$ is further selected from hydrogen, amino, alkenyl of 2-6 carbons, alkylamino, dialkylamino, arylamino and furyl;

$R^3$ and $R^4$ are each selected from hydrogen; cycloalkyl; cycloalkyl having one or two substituents independently selected from alkyl, hydroxy, alkoxy, and halogen; phenyl; phenyl having one or two substituents selected independently from alkyl, alkoxy, halogen, alkanoylamino, cyano and alkoxycarbonyl; straight or branched alkenyl of 2-6 carbons; straight or branched alkyl; and $R^3$ and $R^4$ combined to form pentamethylene, ethyleneoxyethylene or ethylenesulfonylethylene which, with the nitrogen atom to which it is attached, forms a ring; wherein the alkyl substituents and alkyl moieties of the other substituents of $R^5$, $R^3$ and $R^4$ may have 1-3 of the following substituents: hydroxy; halogen; cyano; amino; alkoxy; alkoxyalkoxy; hydroxyalkoxy; succinimido; glutarimido; phenylcarbamoyloxy; phthalimido; phthalimidino; 2-pyrrolidono; cyclohexyl; phenoxy; phenyl; phenyl substituted with alkyl, alkoxy, alkoxycarbonyl, halogen, alkanoylamino or cyano; alkanoylamino; sulfamoyl; alkylsulfamoyl; acrylamido; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

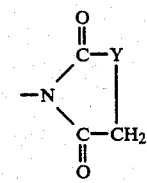

wherein Y is $—NH—$,

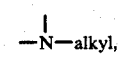

$—O—$, $—S—$, $>CHOH$, or $—CH_2O—$; $—S—R^{10}$ wherein $R^{10}$ is alkyl, phenyl, phenyl substituted with halogen, alkyl, alkoxy, alkanoylamino, cyano or alkoxycarbonyl, pyridyl, pyrimidinyl, benzoxazolyl, benzimidazolyl, benzothiazolyl or

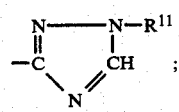

$—SO_2R^9$; $—COOR^9$; $—OXR^9$; $—NH—X—R^9$; $—CONR^{11}R^{11}$; $—SO_2NR^{11}R^{11}$; wherein $R^9$ and X are as defined above and $R^{11}$ is selected from H and $R^9$; alkoxy having 1-3 substituents independently selected from hydroxy, cyano, alkanoyloxy and alkoxy; phenoxy; phenoxy having 1-3 substituents independently selected from alkyl, alkoxy and halogen;

and wherein each of the above alkyl, alkylene, alkoxy, alkanoyl, and such hydrocarbon moieties in the definitions of $R^1$-$R^5$ contain 1-6 carbons.

A preferred group of compounds of this invention has the formula

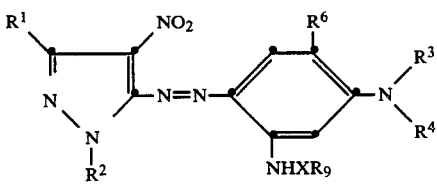

wherein:

$R^1$ is H or alkyl;
$R^2$ is alkyl;
$R^6$ is H or alkyl;
$R^3$ and $R^4$ are selected independently from hydrogen, alkyl, cycloalkyl, and alkyl substituted with aryl, cyclohexyl, acyloxy, cyano, carbamoyl, sulfamoyl, alkylamino, phenylcarbamoyloxy, alkoxy, aryloxy, alkoxycarbonyl, succinimido or phthalimido; X is —CO—, —COO— or —SO$_2$—; and $R^9$ is as defined above.

The azo dyes of the present invention are prepared by diazotizing an amine having the formula

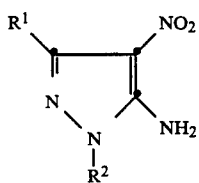

and coupling the resulting diazonium salt with the aniline coupler in conventional manner. The amines and coupling procedures are well known in the art of dye chemistry as evidenced, for example, by the teachings of Chem. Berichte 96, 1963, pp. 1551–1561, and the Journal of Heterocyclic Chemistry, Oct., 1975, pp. 883–887.

The present pyrazoles can be made by procedures known to the art such as described by C. Musante in Gazz. Chim. Ital. 72, 537–48 (1942); Chem. Abs. 38, 4597 (1944); for example as follows:

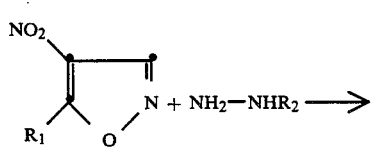

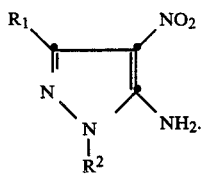

The dyes wherein $R_2$ is alkyl can also be prepared from 5-amino-4-nitro-3-alkyl pyrazole by diazotization and coupling and then alkylating with such alkylating agents as alkyl or arylsulfonate, or sulfate esters, activated halogen compounds such as benzyl chloride, 2-chloroethylsuccinimido or phthalimido, chloroacetone, or the like to yield a mixture of dyes with the diazos having the structures

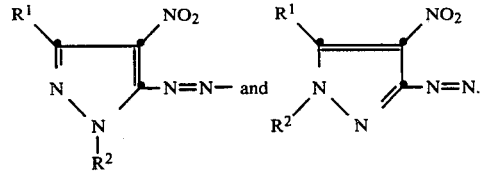

In order for those skilled in the art to better understand how the present invention may be practiced, the following examples are given for the purpose of illustration and not for limitation of the invention.

EXAMPLE 1

Diazotization and Coupling

To a solution of 17.46 g. of 40% nitrosylsulfuric acid, 25.5 ml. of 96.5% sulfuric acid, and 80 ml. of 2–5 acid (2 parts propionic and 5 parts acetic), 7.03 g. of 5-amino-4-nitro-3-methyl-1-methylpyrazole is added below 5° C. The mixture is allowed to stir at 0°–5° C. for 1.5 hours and a 0.005 mol. aliquot is added to a chilled solution of each of the following couplers, prepared by dissolving 0.005 mol. of the coupler in 20 ml of 1:5 acid:

Example 2—3-Acetamido-N,N-diethylaniline;
Example 3—3-Acetamido-N,N-di-n-propylaniline;
Example 4—3-Acetamido-N-benzyl-N-ethylaniline;
Example 5—3-Benzamido-N,N-di-n-propylaniline;
Example 6—5-Acetamido-N-ethyl-2-methylaniline;
Example 7—5-Acetamido-N-cyclohexyl-2-methylaniline;
Example 8—3-Acetamido-N,N-dibenzylaniline;
Example 9—50/50 Mixture of couplrs of Examples 2 and 3; and
Example 10—N,N-Diethyl-3-methanesulfonamidoaniline.

Ammonium acetate is added to the cold coupling mixtures until the mineral acid is neutralized (Congo Red test paper). After allowing to stand one hour, water is added to the coupling mixtures to precipitate the dyes, which are collected by filtration, washed with water, and dried in air. Any dyes which are not filterable solids are washed by decantation and dried in air. All of the dyes are crystallized from hot methanol for purification. The dyes color textured polyester bright red shades.

The dyes of this invention can be applied to synthetic polyamide, polyester, cellulose acetate and other fibers according to known disperse dyeing techniques. Various dispersing and wetting agents can be employed in the dispersion of the finely divided dye compound in an essentially aqueous dyebath. Procedures by which the present dyes can be applied to polyamide textile materials are described, for example, in U.S. Pat. Nos. 3,100,134 and 3,320,021. Typically, in the laboratory, the azo compound (16.7 mg.) is dispersed in 10 cc. of 2-methoxyethanol. A small amount (3–5 cc.) of a 3% sodium lignin sulfonate solution is added, with stirring, and the volume of the bath brought to 150 cc. with water. A 5 g. textile fabric made of Nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250° F. Fabric samples thus dyed with the present dyes exhibit one or more of the improved properties set forth above when tested in accordance with the procedures described, for example, in the Technical Manual of the American Association of Textile Chemists and Colorists, 1968 edition.

A typical general procedure by which polyester, e.g., poly(ethylene terephthalate) can be dyed with the present dyes is as follows. The dye cake is dispersed by heating and agitating a dyepot containing the dye cake and methyl cellosolve. When the dyecake has been ground free of lumps and dissolved as much as possible in the methyl cellosolve, 2% based on weight of the fabric of Igepon T-51 and 2.0% based on weight of the fabric of sodium lignin sulfonate from a premixed solution of the two components is added. Sufficient demineralized water is added to make about a 30:1 bath ratio of water to dye and a small amount of Versene 100 (sodium salt of ethylenediaminetetraacetic acid) and Tanalon JDM-72 (dye carrier) are added. The pH of the dyebath is adjusted to about 5.0 with acetic acid. The fabric samples (wet-out) are entered into the dyepot and the entire contents thereof entered into a pressure dyeing container. The container is sealed and entered into a High Temperature Launder-Ometer which is heated to 120° F. and rotation thereof started. The temperature of the Launder-Ometer is raised to 265° F. at the rate of about 5° F. per minute, and maintained at this temperature for one hour. The Launder-Ometer is then cooled, and the fabric samples removed and scoured in demineralized water containing 1 g/l of neutral soap and 1 g/l sodium carbonate. The samples are rinsed in cold demineralized water and dried at 250° F. in a forced air oven.

The following table shows exemplary dyes of the present invention.

TABLE 1

R¹-C(NO₂)=C(-N=N-C₆H₃(R⁵)-NR³R⁴)-N(R²)- (pyrazole-type structure with R¹, R², R³, R⁴, R⁵)

| Ex. | R¹ | R² | R⁵ | R³ | R⁴ |
|---|---|---|---|---|---|
| 11 | C₆H₄—p-Cl | CH₂CH₂(C₄H₄O₂N) | H | C₂H₅ | C₂H₅ |
| 12 | C₄H₉—n | CH₂SO₂N(CH₃)₂ | 3-CH₃ | C₂H₅ | C₂H₅ |
| 13 | CH₃ | CH₃ | 3-Cl | C₂H₅ | C₂H₅ |
| 14 | CH₂CN | C₆H₄—p-OOCCH₃ | 2-OCH₃—5-Cl | H | C₂H₅ |
| 15 | CH₃ | C₆H₄—p-NO₂ | 2-OCH₃—5-CH₃ | H | C₂H₅ |
| 16 | CH₂CH₂OH | C₂H₅ | 2,5-di-OCH₃ | H | C₂H₅ |
| 17 | CH₃ | CH₂C₆H₅ | 2,5-di-CH₃ | H | C₂H₅ |
| 18 | C₆H₅ | CH₂CONHCH₃ | 2,5-di-Cl | H | C₂H₅ |
| 19 | CH₂OCH₃ | C₆H₃—o,p-di-SO₂CH | 2-SCH₃ | H | C₂H₅ |
| 20 | C₆H₁₁ | C₆H₄—p-COOCH₃ | 3-OC₆H₅ | C₂H₅ | C₂H₅ |
| 21 | C₆H₄—p-CN | C₆H₄—p-(C₄H₄O₂N) | 3-SC₆H₅ | C₂H₅ | C₂H₅ |
| 22 | C₆H₄—p-OH | C₆H₄—o-OC₆H₅ | 3-Br | C₂H₅ | C₂H₅ |
| 23 | C₆H₄—p-OCH₃ | C₆H₄—p-SO₂NH₂ | 3,5-di-NHCOCH₃ | C₂H₅ | C₂H₅ |
| 24 | CH₂OOCCH₃ | C₆H₄—m-CONH₂ | 3,5-di-CH₃ | C₂H₄OC₂H₅ | C₂H₄OC₂H₅ |
| 25 | CH₂Cl | C₆H₄—p-COOCH₃ | 3-NHCOCH(CH₃)₂ | C₂H₅ | C₃H₇—n |
| 26 | CH₂Br | C₆H₄—p-(C₈H₄O₂N) | 3-NHCOC₄H₉—n | C₂H₅ | CH₃ |
| 27 | CH₃ | C₆H₄—p-(C₄H₄O₂N) | 3-NHCOCH₃ | CH₃ | CH₃ |
| 28 | C₆H₂C₆H₅ | C₆H₄—o-OC₆H₅ | 3-NHCOCH₂Cl | CH₃ | C₂H₅ |
| 29 | CH₂OC₆H₅ | C₆H₄—p-SO₂NH₂ | 3-NHCOCH₂OCH₃ | CH₂C₆H₅ | C₂H₅ |
| 30 | CH₂C₆H₅SCH₃ | C₆H₃—o,p-di-SO₂CH₃ | 3-NHCOCH₂OC₆H₅ | CH₂CH₂CN | CH₂CH₂OCOCH₃ |
| 31 | CH₂COOCH₃ | C₆H₄—m-CON(CH₃)₂ | 3-NHCOCH₂C₆H₅ | CH₂CH₂CONH₂ | C₂H₅ |
| 32 | CH₂CONH₂ | CH₂CON(CH₃)₂ | 3-NHCOCH₂NHC₂H₅ | CH₂CH₂OCOCH₃ | C₂H₅ |
| 33 | CH₂C₆H₅ | CH₂CN | 3-NHCOC₂H₅ | CH₂CH₂C₆H₅ | CH₂CH₂C₆H₅ |
| 34 | CH₃ | CH₂CO₂C₂H₅ | 3-NHCOC₆H₁₁ | CH₂CH₂CH₂OCOCH₃ | CH₂CH₂CH₂OCOCH₃ |
| 35 | CH₂SO₂NH₂ | C₆H₃—o,p-di-SO₂CH₃ | 3-NHCOC₆H₄—p-OCH₃ | C₂H₅ | C₂H₅ |
| 36 | CH₂(C₄H₄O₂N) | C₆H₄—p-SCH₃ | 3-NHCOCH₂CN | C₂H₅ | C₂H₅ |
| 37 | C₆H₂—o,m,p-tri-Cl | C₆H₄—CONHC₂H₅ | 3-NHCOCH₂SCH₃ | C₆H₁₁ | C₂H₅ |
| 38 | CH₃ | C₂H₅ | 3-NHCHO | CH(CH₃)C₂H₅ | C₂H₅ |
| 39 | CH₂(C₈H₄O₂N) | CH₂CH₂NO₂ | 3-NHSO₂C₆H₅ | C₂H₅ | H |
| 40 | | CH₂SO₂CH₃ | 2-CH₃—5-NHSO₂CH₃ | C₆H₁₁ | H |
| 41 | CH₃SO₂CH₃ | C₂H₅ | 2-CH₃—5-NHSO₂CH₃ | C₆H₁₁ | H |
| 42 | CH₂CH₂NO₂ | | 2-CH₃—5-NHCOCH₃ | | |
| 43 | C₂H₅ | | | | |
| 44 | CH₃OCCH₃ | CH₃ | 3-NHCO—(furan) | C₂H₅ | C₂H₅ |
| 45 | C₆H₄—p-SCH₃ | C₆H₂—o,m,p-tri-Cl | 3-NHCONH₂ | C₂H₅ | C₂H₅ |
| 46 | C₆H₃—o,p-di-SO₂CH₃ | CH₂(C₄H₄O₂N) | 3-CH₃ | CH₂CH₂CN | C₂H₅ |
| 47 | CH₂SCH₃ | CH₂SO₂NH₂ | 3-CH₃ | CH₂CH₂OCOC₆H₅ | C₂H₅ |

TABLE 1-continued

[Structures shown at top of table:]

$R^1$—C(NO$_2$)=C(—N=N—C$_6$H$_3$(R$^5$)—N(R$^3$)(R$^4$))—N(R$^2$)—N= and $R^1$—C=N—N(R$^2$)—... —N=N—C$_6$H$_3$(R$^5$)—N(R$^3$)(R$^4$)

| Ex. | $R^1$ | $R^2$ | $R^5$ | $R^3$ | $R^4$ |
|---|---|---|---|---|---|
| 48 | CH$_2$Cl | CH$_3$ | 3-CH$_3$ | CH$_2$CH$_2$OCONHC$_2$H$_5$ | C$_2$H$_5$ |
| 49 | C$_6$H$_4$—p-NO$_2$ | C$_6$H$_4$—p-OOCCH$_3$ | 3-CH$_3$ | CH$_2$CH$_2$OCONHC$_6$H$_5$ | C$_2$H$_5$ |
| 50 | CH$_2$CH$_2$CONHCH$_3$ | CH$_2$CONH$_2$ | 3-CH$_3$ | CH$_2$CH$_2$OCOC$_6$H$_4$—p-CH$_3$ | C$_2$H$_5$ |
| 51 | C$_3$H$_7$—n | CH$_2$COOCH$_3$ | 3-CH$_3$ | CH$_2$CH$_2$OH | CH$_2$C$_6$H$_5$ |
| 52 | C$_6$H$_4$—m-CONHCH$_3$ | CH$_2$CH$_2$SCH$_2$C$_6$H$_5$ | 3-CH$_3$ | CH$_2$CH(CH$_3$)—OH | C$_6$H$_{11}$ |
| 53 | C$_6$H$_4$—p-SO$_2$NHCH$_3$ | CH$_2$OC$_6$H$_5$ | 3-CH$_3$ | CH$_2$OC$_6$H$_5$ | C$_2$H$_5$ |
| 54 | C$_6$H$_4$—o-OC$_6$H$_5$ | C$_6$H$_2$C$_6$H$_5$ | 3-CH$_3$ | CH$_2$CH$_2$OCH$_2$CH$_2$OC$_2$H$_5$ | C$_2$H$_5$ |
| 55 | C$_6$H$_4$—p-(C$_4$H$_4$O$_2$N) | CH$_3$ | 3-CH$_3$ | N(CH$_2$CH$_2$)(COCH$_2$)(COCH$_2$) (aziridine-diketone ring) | C$_2$H$_5$ |
| 56 | C$_6$H$_4$—p-(C$_8$H$_4$O$_2$N) | CH$_2$Br | 3-CH$_3$ | CH$_2$CH(OH)CH$_2$Cl | C$_2$H$_5$ |
| 57 | C$_6$H$_4$—p-COOCH$_3$ | CH$_2$Cl | 3-CH$_3$ | CH$_2$CH$_2$NHCOCH$_3$ | C$_2$H$_5$ |
| 58 | C$_6$H$_4$—m-CONH$_2$ | CH$_2$OOCCH$_3$ | 3-CH$_3$ | N(CH$_2$CH$_2$)(CO)(O)(CO) phthalimido-type ring | C$_2$H$_5$ |
| 59 | C$_6$H$_4$—p-SO$_2$NH$_2$ | C$_6$H$_4$—p-OCH$_3$ | 3-CH$_3$ | N(CH$_2$CH$_2$)(CO)(SO$_2$) ring | C$_2$H$_5$ |
| 60 | C$_6$H$_4$—o-OC$_6$H$_5$ | C$_6$H$_4$—p-OH | 3-CH$_3$ | N(CH$_2$CH$_2$)(SO$_2$CH$_3$)(CH$_2$CH$_2$CN) | C$_2$H$_5$ |
| 61 | C$_6$H$_4$—p-(C$_4$H$_4$O$_2$N) | C$_6$H$_4$—p-CN | 3-CH$_3$ | N(CH$_2$CH$_2$)(CONH)(COCH$_2$) ring | C$_2$H$_5$ |

TABLE 1-continued

Structure:

$$\begin{array}{c} R^1 \\ | \\ \text{C} \\ \| \\ \text{C}-\text{NO}_2 \\ | \\ \text{C}=\text{N}-\text{N}= \end{array} \diagdown \text{C}_6\text{H}_3(R^5)-\text{N}(R^3)(R^4)$$

and $$\begin{array}{c} R^1 \\ | \\ \text{C} \\ \| \\ \text{N} \\ | \\ R^2 \end{array}\diagdown \text{N}=\text{N}-\text{C}_6\text{H}_3(R^5)-\text{N}(R^3)(R^4)$$

| Ex. | $R^1$ | $R^2$ | $R^5$ | $R^3$ | $R^4$ |
|---|---|---|---|---|---|
| 62 | $C_6H_4\text{—}p\text{-COOCH}_3$ | $C_6H_{11}$ | 3-$CH_3$ | $CH_2CH_2N\begin{array}{c}COS\\COCH_2\end{array}\diagdown CH_2$ | $C_2H_5$ |
| 63 | $C_6H_3\text{—}o,p\text{-di-SO}_2CH_3$ | $CH_2OCH_3$ | 3-NHCOCH$_3$ | $CH_2CH_2N\begin{array}{c}CO\text{—}CH_2\\COCH_2\end{array}\diagdown CH_2$ | $C_2H_5$ |
| 64 | $CH_3$ | $C_6H_5$ | 3-NHCOCH$_3$ | $CH_2CH_2N\diagdown\begin{array}{c}CO\\\phantom{CO}\end{array}C_6H_4$ (benzoyl-fused) | $C_2H_5$ |
| 65 | $C_6H_4\text{—}p\text{-}C_2H_5$ | $CH_3$ | 3-NHCOCH$_3$ | $CH_2CH_2NHCOC_6H_5$ | $C_2H_5$ |
| 66 | $C_6H_4\text{—}p\text{-NO}_2$ | $CH_2CH_2OH$ | 3-NHCOCH$_3$ | $CH_2CH_2OC\text{-}C_6H_4\text{-}COCH_3$ (p-diacyl phenyl) | $C_2H_5$ |
| 67 | $CH_2CH_2CH_2CN$ | $CH_3$ | 3-NHCOCH$_3$ | $CH_3\text{-}C_6H_4\text{-}CO_2CH_3$ | $C_2H_5$ |
| 68 | $C_6H_4\text{—}p\text{-OOCCH}_3$ | $CH_2CN$ | 3-NHCOCH$_3$ | $CH_2CH_2SO_2NH_2$ | $C_2H_5$ |
| 69 | $CH_3$ | $CH_3$ | 3-NHCOCH$_3$ | $CH_2CH_2SO_2N(C_2H_5)_2$ | $C_2H_5$ |
| 70 | H | $CH_3$ | 3-NHCOCH$_3$ | $C_2H_5$ | $C_2H_5$ |
| 71 | $CH_3$ | $C_2H_5$ | 2-$CH_3$—5-NHCOCH$_3$ | $CH_2CH_2CN$ | $CH_2CH_2N$ |

The invention has been described in detail with particular reference to preferred embodiments thereof, but it will be understood that variations and modifications can be effected within the spirit and scope of the invention.
We claim:
1. The dye having the formula
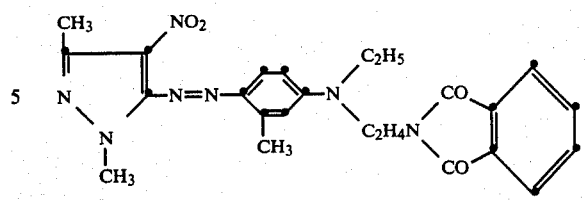
* * * * *